United States Patent
Pedersen (10) Patent No.: US 10,948,896 B2
(45) Date of Patent: Mar. 16, 2021

(54) PENALTY FUNCTION ON DESIGN VARIABLES FOR DESIGNING VARIABLES FOR DESIGNING COST BENEFICIALLY ADDITIVE MANUFACTURABLE STRUCTURES

(71) Applicant: Dassault Systemes Simulia Corp., Providence, RI (US)

(72) Inventor: Claus Bech Wittendorf Pedersen, Norderstedt (DE)

(73) Assignee: Dassault Systemes Simulia Corp., Johnston, RI (US)

(*) Notice: Subject to any disclaimer, the term of this patent is extended or adjusted under 35 U.S.C. 154(b) by 360 days.

(21) Appl. No.: 14/974,414

(22) Filed: Dec. 18, 2015

(65) Prior Publication Data
US 2017/0176975 A1 Jun. 22, 2017

(51) Int. Cl.
*G06F 17/50* (2006.01)
*G05B 19/4099* (2006.01)
(Continued)

(52) U.S. Cl.
CPC ......... *G05B 19/4099* (2013.01); *G06F 30/00* (2020.01); *G06F 30/20* (2020.01);
(Continued)

(58) Field of Classification Search
CPC ..... B05B 19/4099; G06F 30/00; G06F 30/20; G06F 2219/18; G06F 2219/49023; B33Y 50/02; Y02P 80/40; Y02P 90/02
See application file for complete search history.

(56) References Cited

FOREIGN PATENT DOCUMENTS

| JP | 2010067022 | 3/2010 |
|---|---|---|
| JP | 2014197393 | 10/2014 |
| JP | 2017-111826 | 6/2017 |

OTHER PUBLICATIONS

Leary, M., Merli, L., Torti, F., Mazur, M. and Brandt, M., Optimal topology for additive manufacture: A method for enabling additive manufacture of support-free optimal structures, Materials & Design, 63, pp. 678-690, 2014.*

(Continued)

*Primary Examiner* — Mark A Connolly
(74) *Attorney, Agent, or Firm* — Hamilton, Brook, Smith & Reynolds, P.C.

(57) ABSTRACT

One goal in automated product designing of additive manufacturing is to obtain designs having overhangs without support structures if the criterion for overhangs is rigorously geometrical. In an embodiment of the present invention, designers can request automated optimization and design, using simulation and sensitivity-based optimization, of structures having overhangs in the print direction that do not need any support structures. In an embodiment, a method includes, at a processor, calculating model design responses and model sensitivities of a computer-aided engineering (CAE) model in a CAE system based on design variables of the CAE model for various design responses being either applied in objective or constraints. The method further includes optimizing values of the design variables. The method further includes calculating physical design variables by employing a penalty function. Additionally, the calculations can also be in conjunction with employing material interpolation schemes. The method further includes generating an optimized CAE model using the calculated physical design variables. The optimized CAE model is free or partly free of support structures. The method further includes printing the optimized CAE model being free or partly free of support structures.

20 Claims, 10 Drawing Sheets

(51) Int. Cl.
*G06F 30/00* (2020.01)
*G06F 30/20* (2020.01)
*G06F 119/18* (2020.01)
*B33Y 50/02* (2015.01)

(52) U.S. Cl.
CPC ..... *B33Y 50/02* (2014.12); *G05B 2219/49023* (2013.01); *G06F 2119/18* (2020.01); *Y02P 80/40* (2015.11); *Y02P 90/02* (2015.11)

(56) References Cited

OTHER PUBLICATIONS

D. Brackett, I. Ashcroft, R. Hague, Topology optimization for additive manufacturing, in: Proceedings of the Solid Freeform Fabrication Symposium, pp. 348-362, 2011.*

European Search Reported for EP 16 20 4086 dated Apr. 28, 2017, "Penalty Function on Design Variables for Designing Variables for Designing Cost Beneficially Additive Manufacturable Structures".
Leary, M., et al. "Optimal Topology for Additive Manufacture: A Method for Enabling Additive Manufacture of Support-Free Optimal Structures". Materials and Design, vol. 63, pp. 678-690, Jun. 20, 2014.
Brackett, D., et al. "Topology Optimization for Additive Manufacturing", Wolfson School of Mechanical and Manufacturing Engineering, Aug. 17, 2011.
Kim, Tae Soo, et al. "Mac-based Mode-Tracking in Structural Topology Optimization", Computers and Structures, Jan. 7, 1999.
Dias, W., Altair HyperWorks' Insider; "Design and Optimization of Lattice Structures for 3D Printing using OptiStruct", Jun. 23, 2015. http://insider.altairhyperworks.com/design-and-optimization-of-lattice-structures-for-3d-printing-using-altair-optistruct/. Retrieved from Internet Dec. 16, 2015.

* cited by examiner

PENALTY FUNCTION ON DESIGN VARIABLES FOR DESIGNING VARIABLES FOR DESIGNING COST BENEFICIALLY ADDITIVE MANUFACTURABLE STRUCTURES

BACKGROUND

Automated product design relies on optimization of user designs and simulation of those designs. For example, additive manufacturing (e.g., 3-dimensional (3D)-printing) prints layers of a material in a printing direction, such as from a ground level to a higher level. A designer can produce a 3D-model or 3D-printing instructions of a product and quickly and cost-effectively create a rapid prototype of a product. 3D-printing further allows for mass customization of products and production of products that are typically difficult to manufacture by other means.

SUMMARY

One design goal in automated product design of additive manufacturing (e.g., 3D printing) is to obtain designs having overhangs that have no need for support structures. In an embodiment of the present invention, designers, makers, and simulation specialists can request automated optimization and design, using simulation and sensitivity based optimization, of structures having overhangs in the print direction that do not need any support structures if the criterion for overhangs is rigorously geometrical.

Additive manufacturing can print some designs having overhangs, but can have difficulty or require support structures when printing other overhangs based on original design of the overhang. Determining whether support structures are necessary can be a function of a defined angle α of the design. Typically, if the overhangs are greater than defined angle α, then support structures are unnecessary for the additive manufacturing process. The printing angle α is here defined opposite to which sometimes can be found elsewhere. Alternatively, the printing angle can be defined by β also sometimes called overhang angle. A person of ordinary skill in the art can recognize that converting a to β is trivial as the relation is α=90°−β in degrees or in radians α=π/2−β. If overhangs are less than or equal to the defined angle α, then often either overhangs or another design change are needed to successfully print the product. Designs manufactured without or with fewer support structures are cheaper in manufacturing costs because such designs reduce production time, reduce usage of material, and do not require post-manufacturing removal of the support structures.

No known automated design solution exists that integrates a manufacturing process into sensitivity based optimization based upon penalty functions for eliminating the need for support structures in the additive manufacturing process.

Sensitivity based optimization can be, for example, topology optimization or sizing optimization of lattice parts and skin parts. In an embodiment of the present invention, penalty functions on the design variables are employed for designing cost beneficially manufacturable structures to eliminate the need for support structures in the additive manufacturing process. However, the embodiments of the present invention are an integrated solution for topology optimization of additive manufactured structures.

In an embodiment of the present invention, a method and corresponding system and non-transitory program product and thereby modifies a value of given physical design variable ($DV_{physical}$) by adding a penalty depending upon the specific original mathematical value of the design variable (DV) and a penalty function (f) representing the manufacturing constraint settings being a function of the surrounding design variables. Transforming the original mathematical values of the design variables into physical design variables with penalty function(s) for additive manufacturing to eliminate or reduce the need for support structures can be, for example, formulated mathematically as traditional manufacturing processes (e.g., casting and stamping) in sensitivity based optimization.

"Incorporating AM-specific Manufacturing Constraints into Topology Optimization" by Reuben Serphos (hereinafter "Serphos") suggests three different optimization methods: multiple objective, global constraint, and filtering for eliminating support structures for designs obtained using topology optimization.

Serphos suggests that that filtering yields the best optimization results, but has several drawbacks, such as slow optimization convergence, and designs with a lot of intermediate densities, which can cause difficulties in a practical interpretation of the design. In an embodiment of the present invention, a penalty function is applied to the design variables prior to application of a filter. Serphos does not teach or suggest such a penalty function.

In an embodiment, a method includes, at a processor, calculating model design responses (DRESPs) and model sensitivities of a model in a computer aided engineering (CAE) system based on design variables of the CAE model. The method further includes optimizing values of the design variables. The method further includes calculating physical design variables by employing a penalty function and mathematical programming. The method further includes generating an iterative optimized CAE model using the calculated physical design variables. The optimized CAE model is free of support structures or has a reduced number of support structures if all or some subparts of the designed structure are exposed to the penalty function. The method further includes printing the optimized CAE model being free of support structures. The optimized CAE model can be converted to a computer-aided design (CAD) model as intermediate preprocessing before the actual printing.

In an embodiment, optimizing the design variables can include using a sensitivity based approach.

In another embodiment, the method further includes determining whether the optimized CAE model has converged onto a 3D-printable model. If so, the method outputs the optimized CAE model as a final design for 3D printing, and if not, the method repeats the (a) calculating model design responses (DRESPs) and model sensitivities; (b) optimizing values of the design variables, (c) calculating the physical design and (d) generating the optimized CAE model.

In an embodiment, the design variables can be at least one of a physical density of materials used in the CAE model and the numerical density of materials used in the CAE model.

In an embodiment, calculating the physical design variables includes examining a plurality of points of the CAE model, and for each examined point, comparing an angle of material to be placed at that point relative to material already placed in a control space to a threshold angle. If the angle is lower than the threshold angle, the method utilizes the penalty of the penalty function. Applying the penalty function further can cause modification of the CAE model such that the angle of the modified CAE model is higher than the threshold angle. Calculating the physical design variables can further include applying the penalty function recursively until the angle is greater than the threshold angle.

In an embodiment, printing can include at least one of 3D-printing and additive manufacturing.

In an embodiment, optimizing values of the design variables using a sensitivity based approach and calculating physical design variables by employing a penalty function are performed simultaneously. Additionally, the calculations can also be in conjunction with employing material interpolation schemes.

In an embodiment, a system includes a processor, and a memory with computer code instructions stored therein. The memory can be operatively coupled to said processor such that the computer code instructions configure the processor to implement a model calculation module configured to calculate model design responses (DREPSs) and model sensitivities of a model in a computer aided engineering (CAE) system based on design variables of the CAE model. The computer code instructions further configure the processor to implement an optimization module configured to optimize values of the design variables. The computer code instructions configure the processor to implement a penalty function module configured to calculate physical design variables by employing a penalty function and generate an optimized CAE model using the calculated physical design variables. The optimized CAE model is free of support structures or has a reduced number of support structures if all or some subparts of the designed structure are exposed to the penalty function. The computer code instructions further configure the processor to implement a print module configured to print the optimized CAE model being free of support structures.

In an embodiment, a non-transitory computer-readable medium can be configured to store instructions for optimizing a model of a computer aided engineering (CAE) system. The instructions, when loaded and executed by a processor, cause the processor to calculate model design responses (DRESPs) and model sensitivities of a model in a computer aided engineering (CAE) system based on design variables of the CAE model. The instructions further cause the processor to optimize values of the design variables. The instructions further cause the processor to calculate physical design variables by employing a penalty function. The instructions further cause the processor to generate an optimized CAE model using the calculated physical design variables. The optimized CAE model is free of support structures or has a reduced number of support structures if all subparts of the designed structure or some are exposed to the penalty function. The instructions further cause the processor to print the optimized CAE model being free of support structures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Figures 1A, 1B:
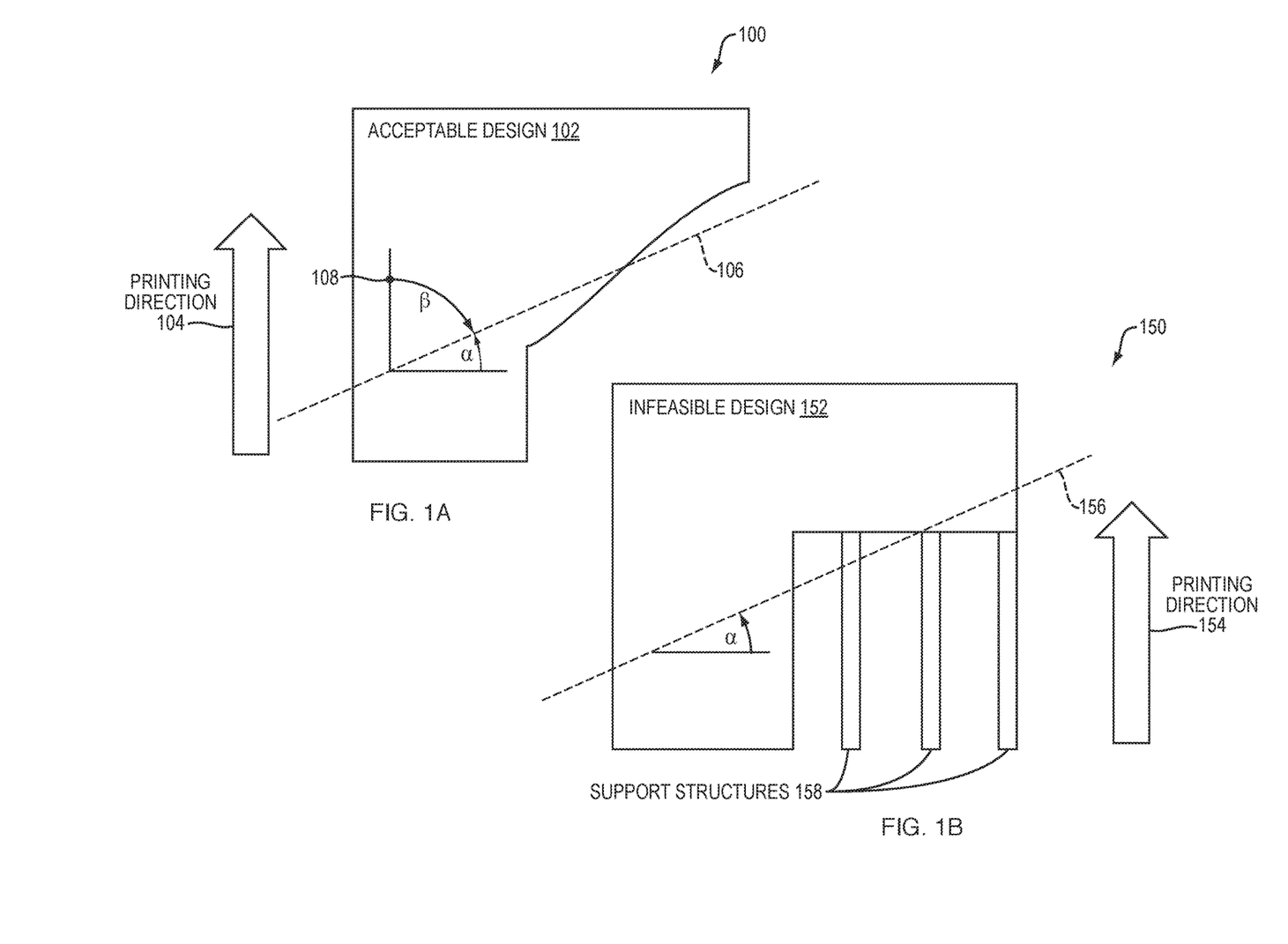
FIGS. 1A-B are diagrams illustrating an example embodiment of an acceptable design and an infeasible design for additive manufacturing with respect to overhangs identified geometrically.

FIGS. 1A-B are diagrams 100 and 150, respectively, illustrating an example embodiment of an acceptable design 102 and an infeasible design 152 for additive manufactured part. The respective designs are printed according to a printing direction 104 and 154, respectively, from the bottom of FIGS. 1A-B to the top. Therefore, each layer of material typically depends on the layer below it for structural support. Overhanging material, as shown in the acceptable design 102 of FIG. 1A and the infeasible or unappealing design 152 of FIG. 152 can be problematic, material consuming, time consuming, and/or financially costly to 3D print. An overhang that is less than a geometrical threshold angle α 156 can be infeasible or unappealing, as in infeasible design 152, but an overhang that is greater than the threshold angle α 106 can be manufactured, as in acceptable design 106. Alternatively, the printing angle can be defined by threshold angle β 108 of FIG. 1A, also called the overhang angle. A person of ordinary skill in the art can recognize that converting α to β is trivial as the relation is α=90°−β in degrees or in radians α=π/2−β.

In the infeasible design 152, in order to manufacture the design, support structures 158 need to be 3D printed. While these structures can later be removed, this increases material costs of manufacturing, in addition to costs related to time of manufacturing, as both printing the support structures and later removing them takes additional time. It can therefore be beneficial to identify infeasible designs such as the infeasible design 152 and modify them before printing to become acceptable designs like acceptable design 102. In this manner, the manufacturer can reduce costs and produce a higher quality product by avoiding printing support structures 158.

Figure 2A:
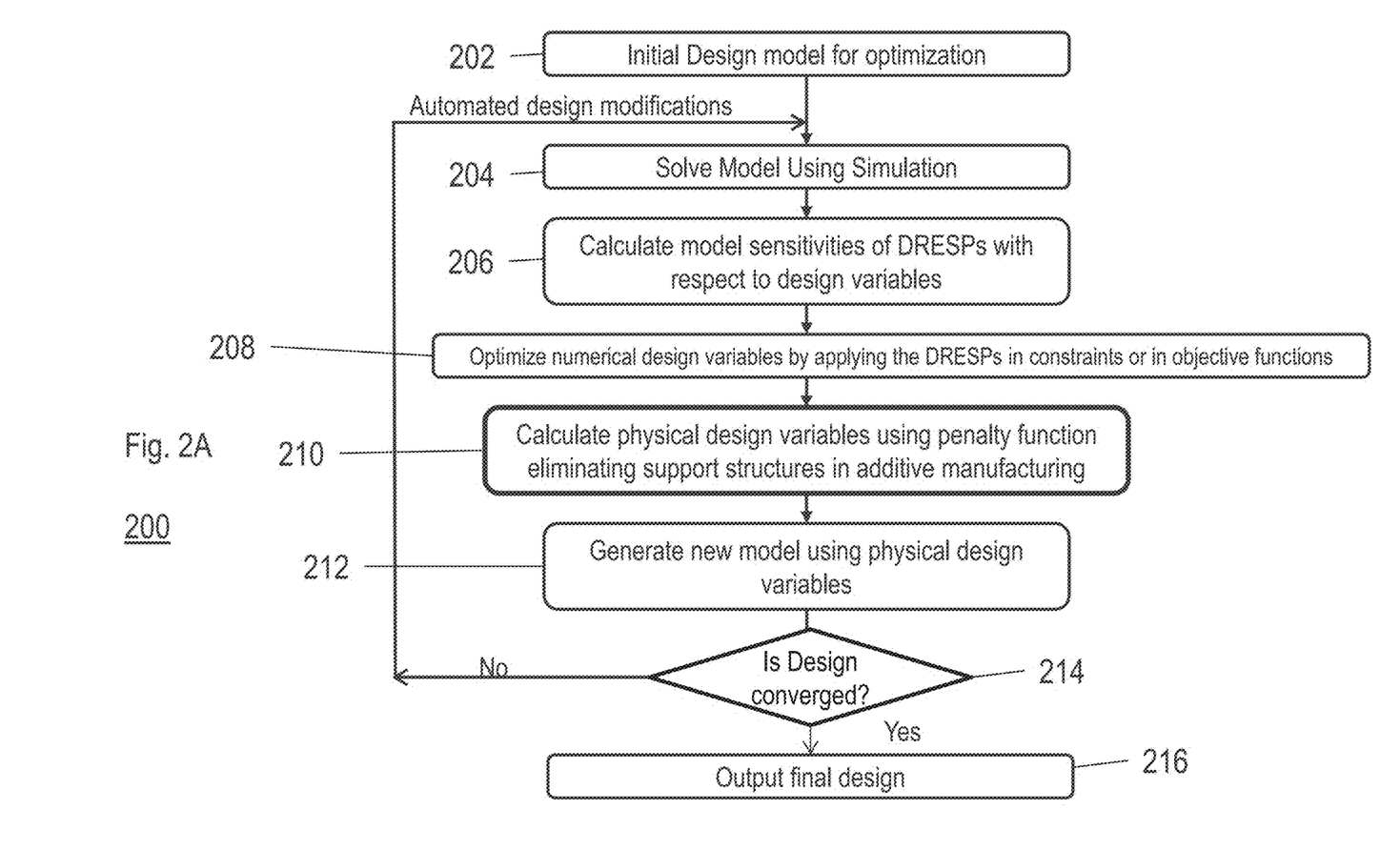
FIG. 2A is a flow diagram illustrating an iterative design process employing a penalty function to eliminate the need of support structures in the manufacturing process of the final design as in embodiments of the present invention.

FIG. 2A is a flow diagram 200 illustrating an iterative design process employing a penalty function to eliminate the need of support structures in the manufacturing process of the final design as in embodiments of the present invention. The iterative design process scheme can be implemented, for example, in a predefined workflow of a computer-aided engineering (CAE) system. First, a designer creates an initial model for optimization (202). The designed model is then applied in an iterative design process (204-214). Each design iteration determines responses of the model, for example as obtained by determining equilibrium of a finite element model. The method then calculates sensitivities with respect to the design variables for the design responses (DRESPs) of objective function and for the constraints (206). The DRESPs define a response for the current analysis model. A DRESP extracts one scalar value which can be a direct measure from the model (e.g., mass, center of gravity, etc.) or can also be simulation (e.g., from the CAE) results of the model (e.g., stresses, eigenfrequencies, displacements, etc.).

The DRESPs are a function of the design variables. The DRESPs are then applied in the definition of the constraints and the objective function of the optimization. The present penalty function is not a DRESP in a constraint or a DRESP for the objective function of the optimization.

The method then optimizes numerical design variables (208) for example by means of mathematical programming, and then updates the numerical design variables then the method calculates optimized physical design variables using a penalty function for the additive manufacturing constraint based on the original numerical values of the design variables (210). The calculations can also be in conjunction with employing material interpolation schemes. Optimizing the design variables can include a sensitivity based approach with respect to the design variables for the design responses (DRESPs). Then, the method generates a new model based on these optimized physical design variables (212). The method then determines whether the new generated model based on the optimized physical variables has converged to a model that can be 3D-printed (214) and additionally general converged can be checked for example as change in objective function and design variables for optimization cycle to optimization cycle. If the optimization has not converged, a new optimization cycle is started (204). When the optimization has converged, then the overhangs of the optimized design can be additive manufactured without the need for any support structures or has a reduced number of support structures if all or some subparts of the designed structure are exposed to the penalty function and the method outputs the final converged design (216).

Figure 2B:
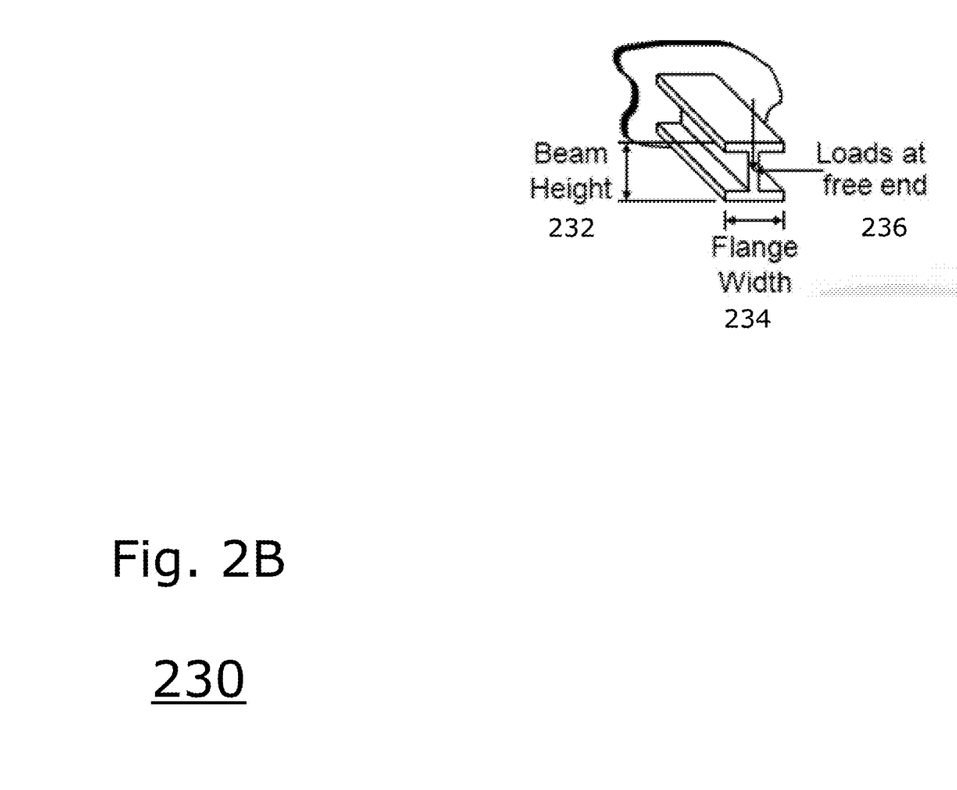
FIG. 2B is a diagram of an example embodiment of a design 230.

FIG. 2B is a diagram of an example embodiment of a design 230. The design 230 is a steel beam having a beam height 232, flange width 234 and loads at the free end 236. The beam height 232 and flange width 234 are examples of design variables. The design variables can have ranges, such as:

10 mm≤Beam Height≤80 mm 10 mm≤Flange Width≤50 mm

The loads 236 can be defined by a constraint, such as:

Stress≤16 MPa

Further, the CAE system can run a simulation with an objective, such as minimizing mass. However, in embodiments of the present invention, the objective, additionally to minimize the mass, is ensuring the resulting design is feasible using additive manufacturing. The objective can also minimize or maximize functions other than mass, such as overall stiffness, stresses, and eigenfrequencies using an embodiment of the present invention.

Basic force equilibrium problems can be linear structural systems with boundary conditions and external loads. Force equilibrium models and analysis consider stiffness, stresses, eigenfrequencies, and displacements under given loadcases and loadcase types. A linear structural system can be represented as $[K]\{u\}=\{P\}$ The design response (DRESP) can be represented as $\theta(\{p\}, \{u\})$ The DRESP can be added to a function representing the objective or a function representing the constraints.

Figure 2C:
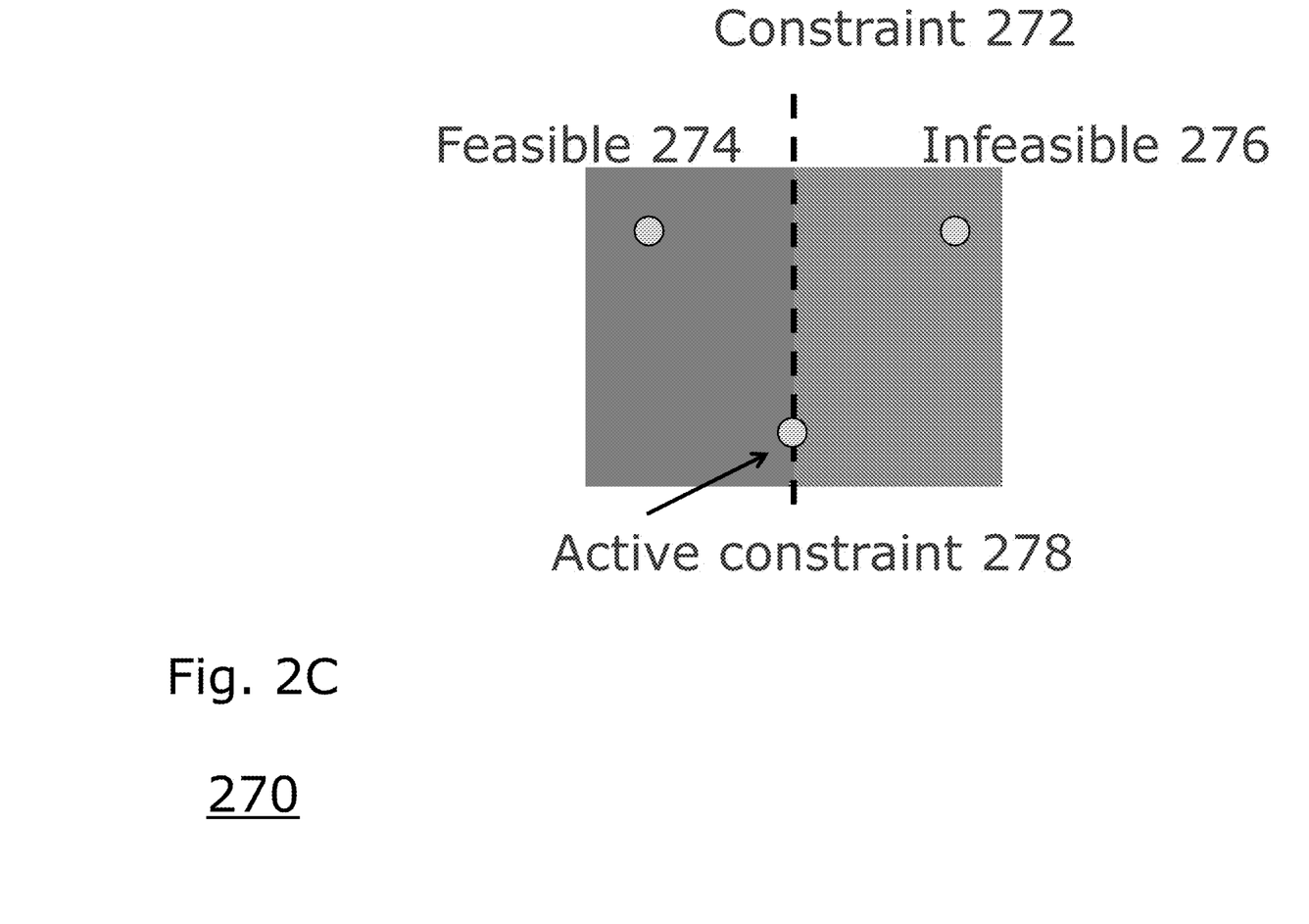
FIG. 2C is a diagram 270 illustrating an example of optimization constraints in a CAE system.

FIG. 2C is a diagram 270 illustrating an example of optimization constraints in a CAE system. The constraint 272 is the dotted line between the feasible region 274 and infeasible region 276. Active constraint 278 represents a value of a design response constraining the model so it is exactly feasible having the exact constraint value for the model, whereas feasible region 274 yields a feasible design where the constraint is not active and thereby the constraint does not influence the design. Infeasible region 276 represents an unacceptable design. Frequently, the constraints are design limitations on structural responses. Structural constraints can be mass constraints, frequency constraints, stress constraints, nodal displacement restrictions, etc. To solve the optimization problem, the system seeks to minimize or maximize the objective for any given constraints.

FIGS. 2B-C illustrate examples of an optimization problem in general in a CAE system. FIG. 2A illustrates an example of optimization to remove support structures in a CAE system, in addition with FIGS. 1 and 3-7, and combined with the optimization methods of FIGS. 2B-C.

Figure 3:
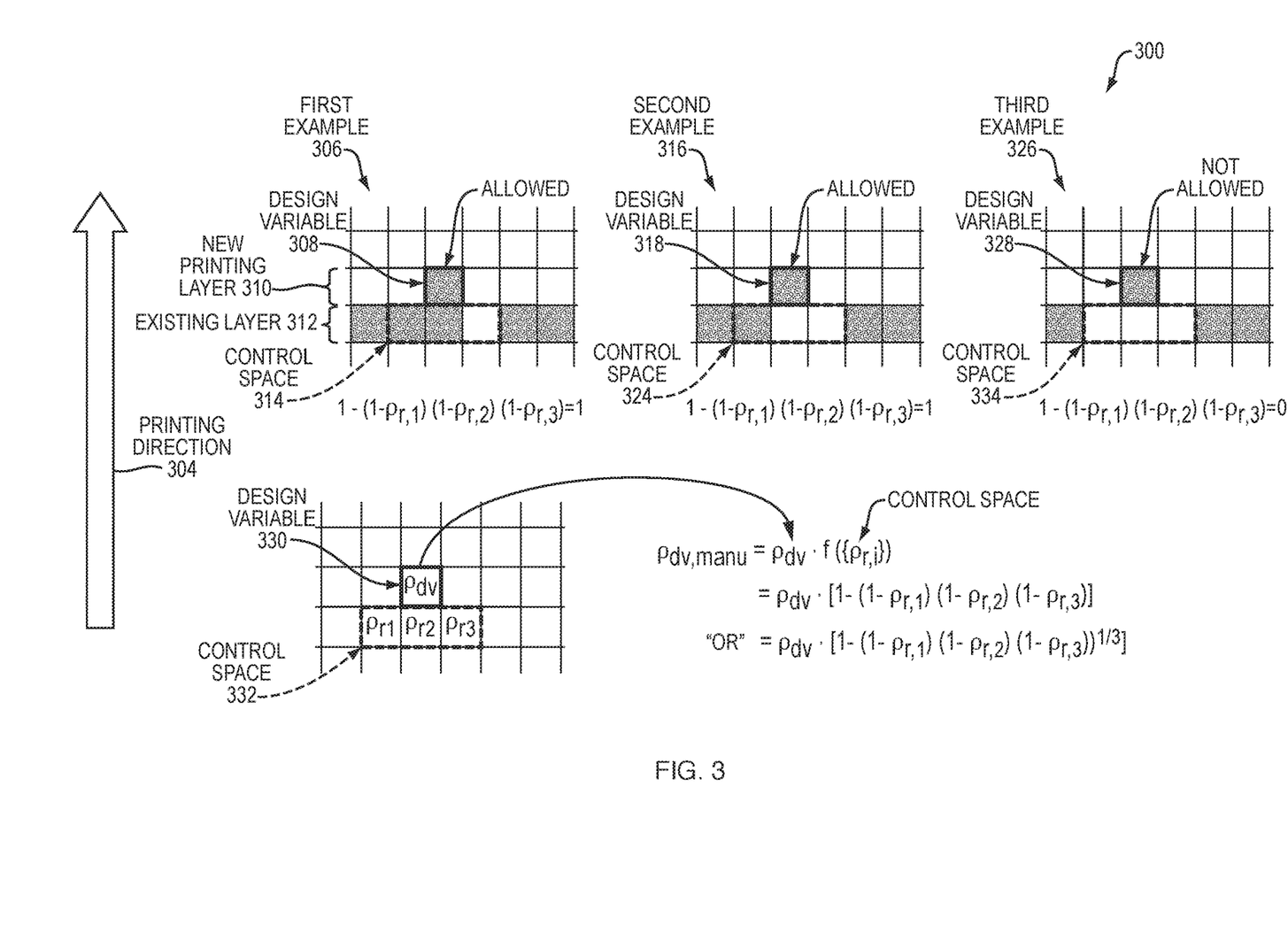
FIG. 3 is a diagram illustrating examples of design variables relative to control spaces.

FIG. 3 is a diagram 300 illustrating examples 306, 316, and 326 of design variables relative to control spaces 314, 324 and 334, respectively. A print direction 304 indicates the direction of layered printing for each example, 306, 316, and 326. For each design variable 308, 318, and 328, a physical variable $\rho_{dv,manu}$ can be calculated based on one of the following relationships:

$$\rho_{dv,manu}=\rho_{dv}\cdot f(\{\rho_{r,i}\})=\rho_{dv}\cdot[1-(1-\rho_{r,1})(1-\rho_{r,2})(1-\rho_{r,3})] \text{ or}$$

$$\rho_{dv,manu}=\rho_{dv}\cdot f(\{\rho_{r,i}\})=\rho_{dv}\cdot[1-(1-\rho_{r,1})(1-\rho_{r,2})(1-\rho_{r,3}))^{1/3}]$$

where $\{\rho_{r,i}\}$ represents the control space.

Therefore, in the first example 306, the design variable 308 in the new printing layer 310 is allowed because the control space 314 in the existing layer 312 supports the new printing layer 310. The physical variable function is calculated to be exact or close to "1", which allows the design variable at that location where ρ="1" for example presents full material and for example ρ~"0" represent air, also called "void".

In the second example 316, the design variable 318 in the new printing layer 310 is allowed because the control space 324 in the existing layer 312 supports the new printing layer 310 even though there is an overhang. The physical variable function is calculated to be exact or close to "1", which allows the design variable at that location.

In the third example 326, the design variable 328 in the new printing layer 310 is not allowed because the control space 334 in the existing layer 312 does not support the new printing layer 310 because there is no block in the existing layer to support the new layer. The physical variable function is calculated to be exact or close to "0", which indicates that the design variable is not allowed at that location.

Figure 4:
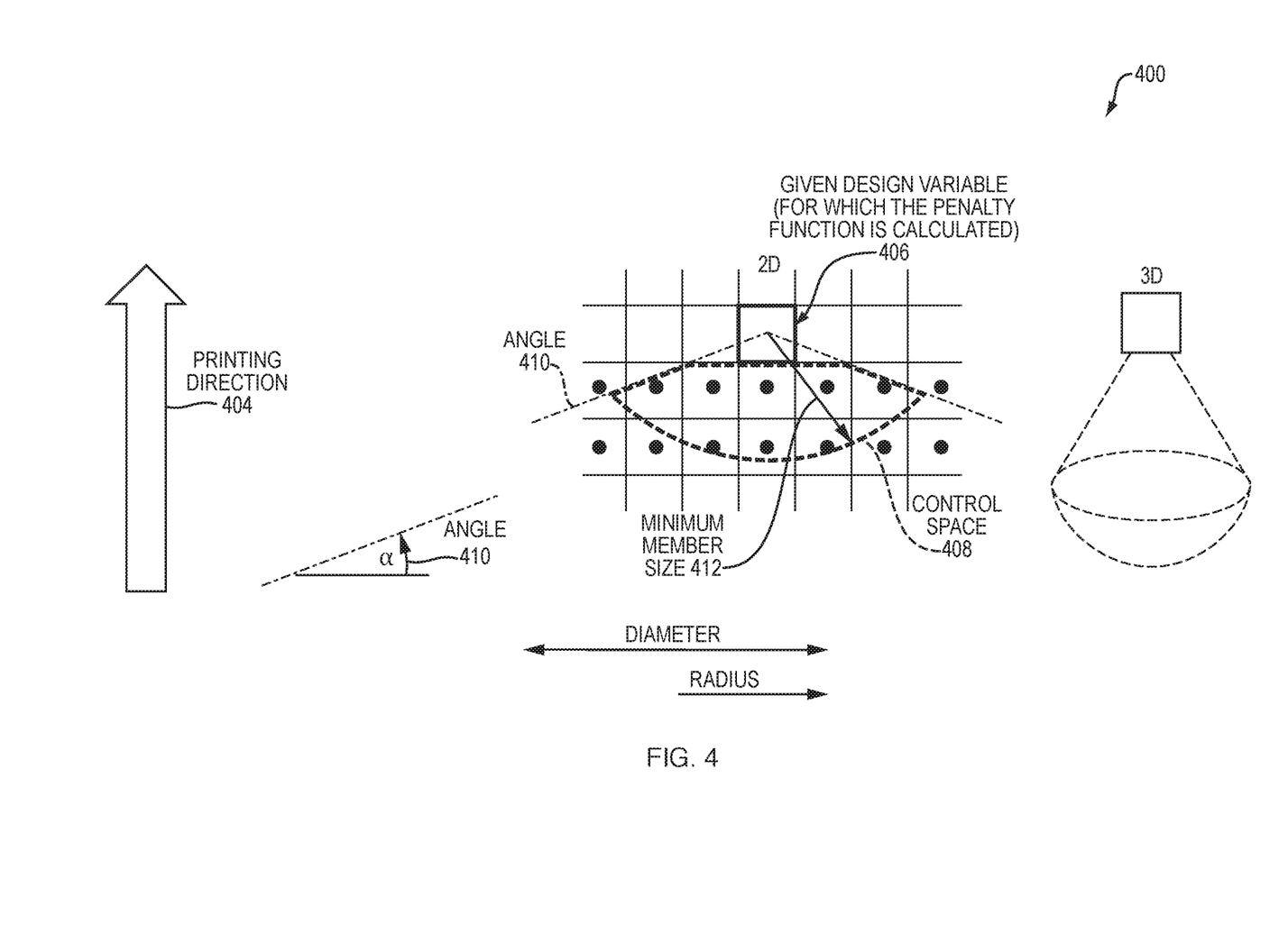
FIG. 4 is a diagram illustrating an example embodiment of a given design variable relative to a control space in both 2-dimensions (2D) and 3-dimensions (3D).

FIG. 4 is a diagram 400 illustrating an example embodiment of a given design variable 406 relative to a control space 408 in both 2-dimensions (2D) and 3-dimensions (3D). A printing direction 404 indicates that the control space 408 is printed before the design variable 406 space. As is shown in the 3D portion of the diagram, the control space includes a hemisphere and a pyramid- or cone-like region on top that additive manufacturing is attempting to complete in the area of the design variable 406. The angle 410 represents the minimum angle for an overhang for the given design variable. A small (or lower) angle than angle 410 can be infeasible to manufacture, where a higher angle than angle 410 can still remain feasible. The minimum member size 412 is illustrated showing the radius from the design variable 406 location to the edge of the control space 408. These factors define a control space that spans the design variables defining the penalty function of the given design variable.

Figure 5A:
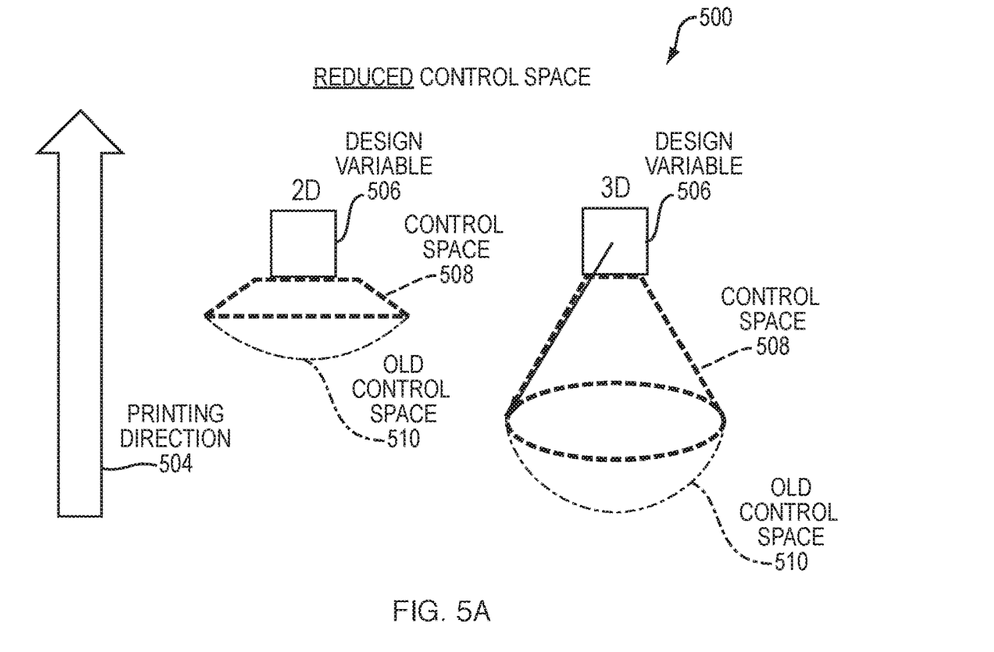
FIGS. 5A-B are diagrams illustrating example embodiments of different respective control spaces, respectively.
Figure 5B:
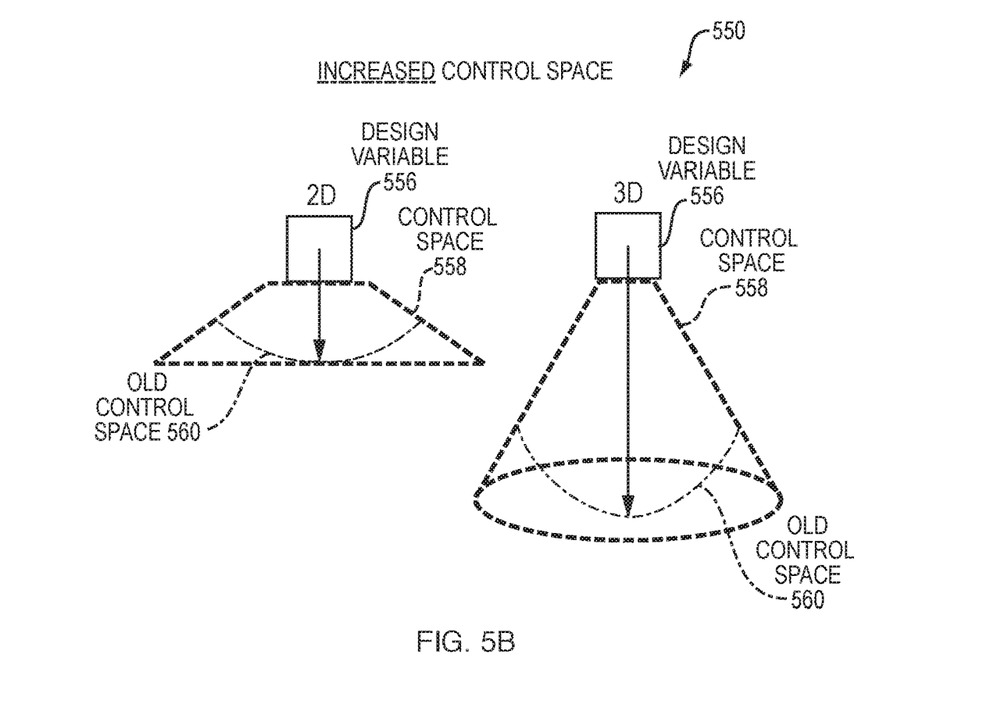

FIGS. 5A-B are diagrams 500 and 550 illustrating example embodiments of different respective control spaces 508 and 558, respectively. The alternative control space 508 represents the partial pyramid- or cone-like structure without the sphere of the old control space 510. The design variable 506 is at the top of the control space 508. This is a reduce control space compared to the old control space 510.

On the other hand, FIG. 5B illustrates a diagram 550 having an increased control space. The control space 558 is a partial pyramid- or cone-like structure, but includes the entire old control space 560, in addition to other material. The design variable 556 is at the top of the control space 558.

Figure 6:
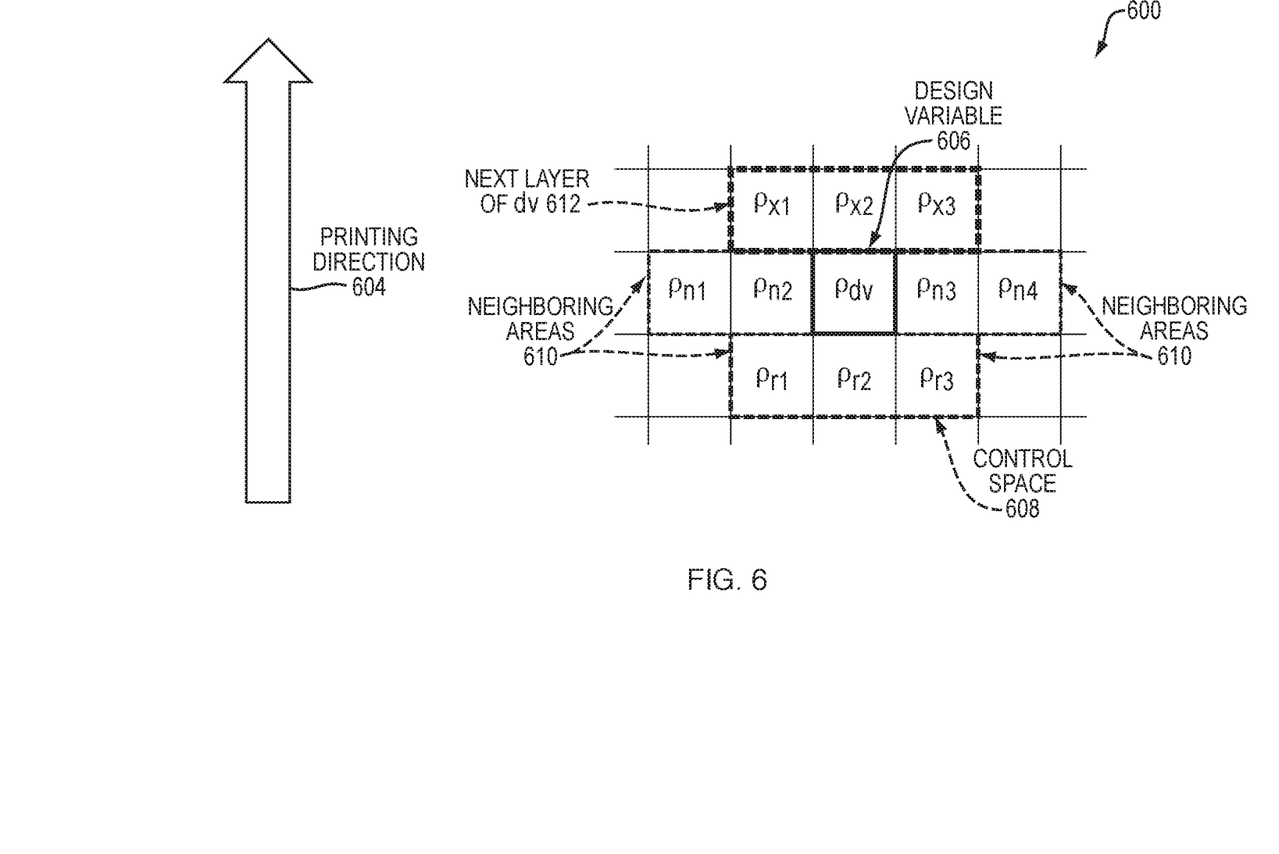
FIG. 6 is a diagram illustrating an example of areas representing the control space 608, neighboring areas, and a design variable, and the next layer of design variables.

FIG. 6 is a diagram 600 illustrating an example of areas representing the control space 608, neighboring areas 610, and a design variable 606, and the next layer of design variables 612. A print direction 604 indicates the direction of the additive manufacturing or 3D-printing. The control space 608 is represented by variables $\rho_{r1}$, $\rho_{r2}$, and $\rho_{r3}$. The neighboring areas 610 are represented by variables $\rho_{n1}$, $\rho_{n2}$, $\rho_{n3}$, and $\rho_{n4}$. The design variable 606 is represented by $\rho_{dv}$. The next layer of the design variable is represented by $\rho_{x1}$, $\rho_{x2}$, and $\rho_{x3}$.

It is further assumed for the present example that the design variables have the following coupling:

$$\rho_r = \rho_{r1} = \rho_{r2} = \rho_{r3},$$

$$\rho_n = \rho_{n1} = \rho_{n2} = \rho_{n3} = \rho_{n4},$$

$$\rho_x = \rho_{x1} = \rho_{x2} = \rho_{x3}.$$

Thereby, the relation between design variable and a given design response (DRESP) yields:

$$\frac{d(DRESP)}{d\rho_{dv}} = \frac{d(DRESP)}{d\rho_{physicaldv}} \cdot f(\rho_{dv}) + \frac{d(DRESP)}{d\rho_{physicalx1}} \cdot \rho_{x1} \cdot \frac{f(\rho_{x1})}{\partial \rho_{dv}} +$$

$$\frac{d(DRESP)}{d\rho_{physicalx2}} \cdot \rho_{x2} \cdot \frac{f(\rho_{x2})}{\partial \rho_{dv}} + \frac{d(DRESP)}{d\rho_{physicalx3}} \cdot \rho_{x3} \cdot \frac{f(\rho_{x3})}{\partial \rho_{dv}} = \frac{d(DRESP)}{d\rho_{physicaldv}} \cdot$$

$$f(\rho_{dv}) + \left[\frac{d(DRESP)}{d\rho_{physicalx1}} + \frac{d(DRESP)}{d\rho_{physicalx2}} + \frac{d(DRESP)}{d\rho_{physicalx3}}\right] \cdot \rho_x \cdot \frac{f(\rho_x)}{\partial \rho_{dv}}$$

Additionally, as illustrated, the mass or the material volume is chosen as design response (DRESP) being here chosen as a linear function of the design variable and elemental volume v:

For mass: $\frac{d(DRESP)}{d\rho_{physicaldv}} = v \frac{d(DRESP)}{d\rho_{physicalx1}} = \frac{d(DRESP)}{d\rho_{physicalx2}} = \frac{d(DRESP)}{d\rho_{physicalx3}} = v$ If not only the physical design variables are present as results of the optimization but also the numerical mathematical design variables then one can indirectly establish the relation between physical design variables and the numerical mathematical design variables and see if a penalty function is applied.

The penalty function is defined by user specifications for a given additive manufacturing process, described by the minimum member size and the angle α for a given print direction in the additive manufacturing process. The penalty function ($f$) can be defined below:

$$DV_{physical} = DV \cdot f(\{DV_{physical} \text{ or } DV\})$$

where $DV_{physical}$ is an external physical design variable to be manufactured, DV is an internal original mathematical design variable to be optimized, and $f(\{DV_{physical} \text{ or } DV\})$ is the manufacturing penalty function determined by user specified manufacturing specifications.

An overhang penalty function can be defined as follows:

$$\rho_{physical,element} = \rho_{element} \cdot f(\{\rho_{i,overhang\ group}\})$$

where $\rho_{physical,element}$ is an external design variable for a given element, $\rho_{element}$ is an internal design variable of a given element, and $f(\{\rho_{i,overhand\ group}\})$. Examples of the function $f$ can be:

$$f(\{\rho_{i,overhang\ group}\}) = $$
$$1 - [(1-p_1)(1-p_2) \ldots (1-p_i) \ldots (1-p_{1-L})(1-p_L)]$$

$$f(\{\rho_{i,overhang\ group}\}) = $$
$$1 - \sqrt[L]{(1-p_1)(1-p_2) \ldots (1-p_i) \ldots (1-p_{1-L})(1-p_L)}$$

Each design variable corresponds with design responses (DRESPs) being functions of the design variable. The "overhang penalty function" can be differentiated yielding the following relationship:

$$\frac{\partial \rho_{physical,elem}}{\partial \rho_t} = \frac{\partial \rho_{elem}}{\partial \rho_i} \cdot f(\{\rho_{i,overhang\ group}\}) + \rho_{elem} \cdot \frac{\partial f(\{\rho_{i,overhang\ group}\})}{\partial \rho_i}$$

$$= (0 \text{ or } 1) \cdot f(\{\rho_{i,overhang\ group}\}) + \rho_{elem} \cdot \frac{\partial f(\{\rho_{i,overhang\ group}\})}{\partial \rho_i}$$

Then, differentiating a given penalty function can be shown as following:

$$f(\{\rho_{elem,overhang\ group}\}) = $$
$$1 - [(1-\rho_1)(1-\rho_2) \ldots (1-\rho_i) \ldots (1-\rho_{I-1})(1-\rho_I)]$$

$$\Rightarrow \frac{\partial f(\{\rho_{i,overhang\ group}\})}{\partial \rho_t} = $$

$$[(1-\rho_1)(1-\rho_2) \ldots (1-\rho_{I-1})(1-\rho_I)] = \frac{1 - f(\{\rho_{elem,overhang\ group}\})}{(1-\rho_i)}$$

$$\Rightarrow \text{if } \rho_i = 1 \text{ then } \frac{\partial f(\{\rho_{t,overhang\ group}\})}{\partial \rho_t} = 0$$

or for another penalty function as:

$$f(\{\rho_{elem,overhang\ group}\}) =$$
$$1 - \sqrt[I]{(1-\rho_1)(1-\rho_2)\ldots(1-\rho_i)\ldots(1-\rho_{I-1})(1-\rho_I)}$$
$$\Rightarrow \frac{\partial f(\{\rho_{i,overhang\ group}\})}{\partial \rho_i} = \frac{1}{I}\frac{1}{(1-\rho_1)}[(1-\rho_1)$$
$$(1-\rho_2)\ldots(1-\rho_i)\ldots(1-\rho_{I-1})$$
$$(1-\rho_I)][(1-\rho_1)(1-\rho_2)\ldots(1-\rho_i)\ldots(1-\rho_{I-1})(1-\rho_I)]^{\frac{1-I}{I}} =$$
$$\frac{1}{I} + \frac{1}{(1-\rho_I)}[(1-\rho_1)(1-\rho_2)\ldots(1-\rho_i)\ldots(1-\rho_{I-1})$$
$$(1-\rho_I)]^{\frac{1}{I}} = \frac{1 - f(\{\rho_{elem,overhang\ group}\})}{I(1-\rho_i)}$$

$$\Rightarrow \text{if } \rho_i = 1 \text{ then } \frac{\partial f(\{\rho_{i,overhang\ group}\})}{\partial \rho_i} = 0$$

One differentiating function that is independent of the design variable, $\rho_{dv}$, and has a built in penalization is shown below where the mass or the material volume is chosen design response (DRESP) type:

$$\text{DRESP\_part}_{\rho_{dv}} =$$
$$v \cdot \lfloor \rho_{dv} \cdot (1 - (1-\rho_r)^3) + 3 \cdot \rho_x \cdot (1 - (1-\rho_{dv})(1-\rho_n)^2) \rfloor$$
$$\Rightarrow \frac{d(DRESP)}{d\rho_{dv}} = v \cdot f(\rho_{dv}) + 3v \cdot \rho_x \cdot \frac{f(\rho_x)}{\partial \rho_{dv}} =$$
$$v \cdot [(1-(1-\rho_r)^3) + 3 \cdot \rho_x \cdot (1-\rho_n)^2]$$

where $f(\rho_{dv})=1-(1-\rho_r)^3$ and $f(\rho_x)=1-(1-\rho_{dv})(1-\rho_n)^2$.

In an example embodiment, a method for differentiating can include an initialization step and several iterations of calculations, as illustrated in FIG. 2, for example. Sensitivities can be determined by setting $$\frac{d(DRESP)}{d\rho_i}$$

to be $$\frac{d(DRESP)}{d\rho_{physical\ plan}} \frac{\partial \rho_{physical\ plan}}{\partial \rho_i}.$$

Then, for each value of el_design starting from 1, the method:
a) sets $$\frac{d(DRESP)}{d\rho_{el\_design}}$$

to be $$\frac{d(DRESP)}{d\rho_{el\_design}} + \frac{d(DRESP)}{d\rho_{physical,el\_design}} \cdot f(\{\rho_{overhang\ group}\}),$$

and
b) for each value of el_con, sets $$\frac{d(DRESP)}{d\rho_{el\_con}}$$

to be $$\frac{d(DRESP)}{d\rho_{el\_con}} + \frac{d(DRESP)}{d\rho_{physical,el\_design}} \cdot \rho_{el\_design} \cdot \frac{\partial f(\{\rho_{overhang\ group}\})}{\partial \rho_{el\_con}}.$$

Another penalty function which is dependent upon the design variable, $\rho_{dv}$, is shown below:

$$\text{DRESP\_part}_{\rho_{dv}} = v \cdot \left[\rho_{dv} \cdot \rho_r + 3 \cdot \rho_x \cdot \left(1 - \sqrt[3]{(1-\rho_{dv})(1-\rho_n)^2}\right)\right]$$
$$\Rightarrow \frac{d(DRESP)}{d\rho_{dv}} = v \cdot f(\rho_{dv}) + 3v \cdot \rho_x \cdot \frac{f(\rho_x)}{\partial \rho_{dv}} =$$
$$v \cdot \left[\rho_r + \rho_x \cdot \frac{\sqrt[3]{(1-\rho_{dv})(1-\rho_n)^2}}{1-\rho_{dv}}\right]$$

where $f(\rho_{dv}) = 1 - \sqrt[3]{(1-\rho_r)^3} = \rho_r$ and $$f(\rho_x) = 1 - \sqrt[3]{(1-\rho_{dv})(1-\rho_n)^2}.$$

Various types of penalty functions can be employed for sensitivity based topology and other optimization types. The penalty function $f$ can factor design variables such as physical densities being manufactured or the numerical densities in the control spaces. The penalty function can therefore eliminate the use of support structure of overhangs in the additive manufacturing of designed structure.

Two indirect options for detection can be present also in commercial programs. The sensitivities for the design responses (DRESPs) of objective function and for the constraints with respect to the design variables can be checked, if they are present for post processing. The sensitivities show if a penalty function for eliminating overhangs with support structures has been applied as the sensitivities with respect to the design variables are derived through the physical design variables and if penalty function is applied. They can be derived by a complex inverse identification process, but using a design response as mass or material volume together with a low minimum member size, it is possible as in the above equations.

Figure 7:
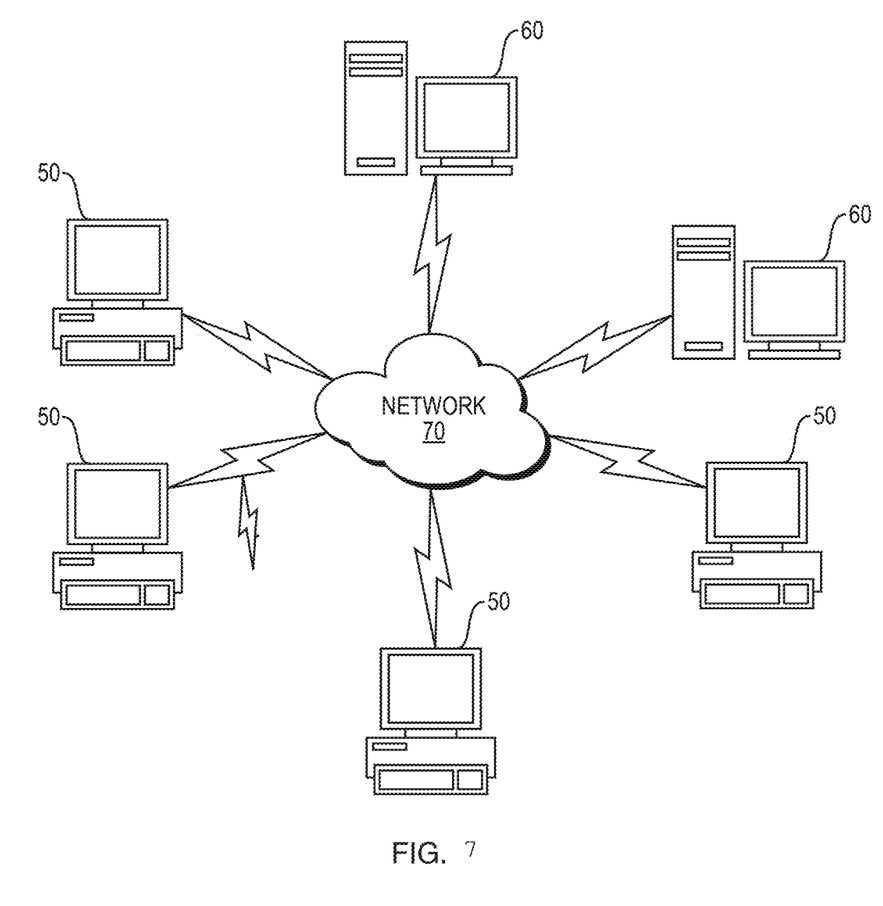
FIG. 7 illustrates a computer network or similar digital processing environment in which embodiments of the present invention may be implemented.

FIG. 7 illustrates a computer network or similar digital processing environment in which embodiments of the present invention may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Figure 8:
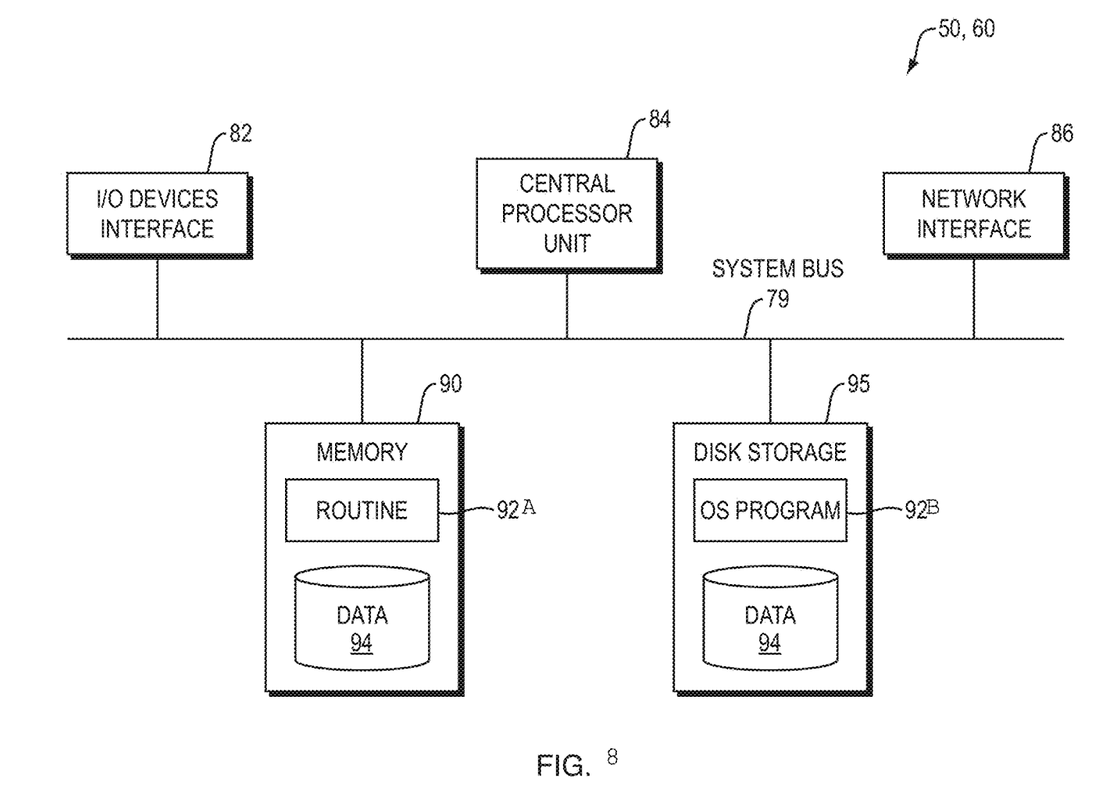
FIG. 8 is a diagram of an example internal structure of a computer (e.g., client processor/device or server computers) in the computer system of FIG. 7.

FIG. 8 is a diagram of an example internal structure of a computer (e.g., client processor/device 50 or server computers 60) in the computer system of FIG. 7. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 7). Memory 90 provides volatile storage for computer software instructions 92 (e.g., routine 92A and OS program 92B) and data 94 used to implement an embodiment of the present invention (e.g., penalty function module code detailed above). Disk storage 95 provides non-volatile storage for computer software instructions 92 and data 94 stored either in memory 90 and disk storage 95 used to implement an embodiment of the present invention. A central processor unit 84 is also attached to the system bus 79 and provides for the execution of computer instructions.

In one embodiment, the processor routines 92 and data 94 are a computer program product (generally referenced 92), including a non-transitory computer-readable medium (e.g., a removable storage medium such as one or more DVD-ROM's, CD-ROM's, diskettes, tapes, etc.) that provides at least a portion of the software instructions for the invention system. The computer program product 92 can be installed by any suitable software installation procedure, as is well known in the art. In another embodiment, at least a portion of the software instructions may also be downloaded over a cable communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present invention routines/program 92.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method comprising:
by a processor:
initializing a plurality of physical variables and a plurality of parameterized design variables in a computer-aided engineering (CAE) model in a CAE system, the CAE model having a plurality of layers for additive manufacturing, each physical variable representing a physical property for a location of the CAE model and each parameterized design variable representing numerical values defining at least one characteristic of the CAE model;
calculating a physical variable for a given location of a new layer of the CAE model by multiplying a penalty function with at least one parameterized design variable for the given location of the CAE model, the penalty function representing a constraint on previously calculated physical variables in a previously calculated layer in a location related to the given location, the constraint representing an optimized value of a model design response of the CAE model that yields a feasible design, the feasible design being a CAE model free of the need of extraneous support structures;
generating an optimized CAE model having the feasible design using the calculated physical variable; and
printing the optimized CAE model being free of extraneous support structures.

2. The method of claim 1, further comprising:
determining whether the optimized CAE model has converged onto a 3D-printable model;
if so, outputting the optimized CAE model as a final design for 3D printing;
if not, repeating the calculating the physical variable and generating the optimized CAE model.

3. The method of claim 1, wherein the parameterized design variables are at least one of a physical density of materials used in the CAE model and the numerical density of materials used in the CAE model.

4. The method of claim 1, wherein calculating the physical variable includes:
comparing, for each of a plurality of locations of the CAE model, an angle of material to be placed at that point relative to material already placed in a control space to a threshold angle, and if the angle is lower than the threshold angle, the penalty function is penalizing the material of given point.

5. The method of claim 4, wherein applying the penalty function further causes modification of the CAE model such that the angle of the modified CAE model is higher than the threshold angle.

6. The method of claim 5, further comprising calculating the physical variable by applying the penalty function is performed recursively until the angle is higher than the threshold angle.

7. The method of claim 1, wherein printing includes at least one of 3D-printing and additive manufacturing.

8. The method of claim 1, wherein optimizing values of the design variables using a sensitivity based approach and calculating the physical variable by employing a penalty function are performed simultaneously.

9. A system comprising:
a processor; and
a memory with computer code instructions stored therein, the memory operatively coupled to said processor such that the computer code instructions configure the processor to implement:
a model calculation module configured to initialize a plurality of physical variables and a plurality of parameterized design variables in a computer-aided engineering (CAE) model in a CAE system, the CAE model having a plurality of layers for additive manufacturing, each physical variable representing a physical property for a location of the CAE model and each parameterized design variable representing numerical values defining at least one characteristic of the CAE model;

a penalty function module configured to calculate a physical variable for a given location of a new layer of the CAE model by multiplying a penalty function with at least one-parameterized design variable for the given location of the CAE model, the penalty function representing a constraint on previously calculated variables in a previously calculated layer in a location related to the given location, the constraint representing an optimized value of a model design response of the CAE model that yields a feasible design, the feasible design being a CAE model free of the need of extraneous support structures, and generate an optimized CAE model having the feasible design using the calculated physical variable; and a print module configured to print the optimized CAE model being free of extraneous support structures.

10. The system of claim 9, wherein the computer code instructions configure the processor to implement:

a convergence module configured to determine whether the optimized CAE model has converged onto a 3D-printable model, and if so, outputting the optimized CAE model as a final design for 3D printing, and if not, repeating the calculating the physical design variables and generating the optimized CAE model.

11. The system of claim 9, wherein the parameterized design variables are at least one of a physical density of materials used in the CAE model and the numerical density of materials used in the CAE model.

12. The system of claim 9, wherein the penalty function module is further configured to:

compare, for each of a plurality of locations of the CAE model, an angle of material to be placed at that point relative to material already placed in a control space to a threshold angle, and if the angle is lower than the threshold angle, the penalty function is penalizing the material of given point.

13. The system of claim 12, wherein applying the penalty function further causes modification of the CAE model such that the angle of the modified CAE model is higher than the threshold angle.

14. The system of claim 13, wherein the penalty function module is further configured to calculate the physical variable by applying the penalty function recursively until the angle is higher than the threshold angle.

15. The system of claim 9, wherein the printing module is configured to employ at least one of 3D-printing and additive manufacturing.

16. The system of claim 9, wherein the optimization module is configured to optimize values of the design variables simultaneously with the penalty function module calculating the physical variable.

17. A non-transitory computer-readable medium configured to store instructions for optimizing a computer-aided engineering (CAE) model of a CAE system, the instructions, when loaded and executed by a processor, causes the processor to:

initializing a plurality of physical variables and a plurality of parameterized design variables in a CAE model in the CAE system, the CAE model having a plurality of layers for additive manufacturing, each physical variable representing a physical property for a location of the CAE model and each parameterized design variable representing numerical values defining at least one characteristic of the CAE model;

calculate a physical variable for a given location of a new layer of the CAE model by multiplying a penalty function with at least one parameterized design variable for the given location of the CAE model, the penalty function representing a constraint on previously calculated physical variables in a previously calculated layer in a location related to the given location, the constraint representing an optimized value of a model design response of the CAE model that yields a feasible design, the feasible design being a CAE model free of the need of extraneous support structures;

generate an optimized CAE model having the feasible design using the calculated physical design variable; and print the optimized CAE model being free of extraneous support structures.

18. The non-transitory computer-readable medium of claim 17, wherein the instructions further cause the processor to:

determine whether the optimized CAE model has converged onto a 3D-printable model;

if so, output the optimized CAE model as a final design for 3D printing;

if not, repeat the calculating the physical variable and generating the optimized CAE model.

19. The non-transitory computer-readable medium of claim 17, wherein the parameterized design variables are at least one of a physical density of materials used in the CAE model and the numerical density of materials used in the CAE model.

20. The non-transitory computer-readable medium of claim 17, wherein calculating the physical design variables includes:

comparing, for each of a plurality of locations of the CAE model, an angle of material to be placed at that point relative to material already placed in a control space to a threshold angle, and if the angle is lower than the threshold angle, the penalty function is penalizing the material of given point.

* * * * *